(12) United States Patent
Yasuhara et al.

(10) Patent No.: US 8,628,136 B2
(45) Date of Patent: Jan. 14, 2014

(54) MOTORCYCLE FAIRING

(75) Inventors: Hidefumi Yasuhara, Kobe (JP); Kaoru Kouchi, Kakogawa (JP); Takashi Nishiyama, Akashi (JP)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 73 days.

(21) Appl. No.: 13/227,275

(22) Filed: Sep. 7, 2011

(65) Prior Publication Data

US 2012/0061989 A1    Mar. 15, 2012

(30) Foreign Application Priority Data

Sep. 15, 2010 (JP) ................................. 2010-206603

(51) Int. Cl.
*B62J 17/00* (2006.01)
*B62J 6/00* (2006.01)

(52) U.S. Cl.
USPC ..................... 296/78.1; 296/193.03; 362/473; 362/549

(58) Field of Classification Search
USPC ........ 296/77.1, 78.1, 91, 181.1, 181.2, 181.5, 296/187.03, 187.07, 193.03; 280/210; 180/219, 229; 362/472, 473, 549
See application file for complete search history.

(56) References Cited

U.S. PATENT DOCUMENTS

| | | | |
|---|---|---|---|
| 3,950,727 A * | 4/1976 | Smith | ............................ 362/473 |
| 4,678,223 A | 7/1987 | Kishi et al. | |
| 7,410,025 B2 | 8/2008 | Sunaguchi et al. | |
| 2006/0037798 A1 | 2/2006 | Konno et al. | |
| 2006/0048991 A1 | 3/2006 | Sunaguchi et al. | |
| 2008/0030041 A1* | 2/2008 | Kurihara | ...................... 296/78.1 |
| 2009/0050386 A1 | 2/2009 | Nobuhira | |
| 2009/0108629 A1 | 4/2009 | Takahashi et al. | |

FOREIGN PATENT DOCUMENTS

| | | |
|---|---|---|
| CN | 201321113 | 10/2009 |
| EP | 2 161 187 | 3/2010 |
| JP | 2005-153664 | 6/2005 |

OTHER PUBLICATIONS

European Application No. 11007430.9 Search Report dated Dec. 30, 2011, 7 pages.
European Application No. 11007430.9 Extended Search Report dated May 2, 2012, 9 pages.
European Application No. 11 007 430.9 Communication Pursuant to Article 94(3) EPC dated Jan. 21, 2013, 3 pages.
Chinese Application No. 201110271177.1 Office Action dated Feb. 1, 2013. 10 pages including partial English translation.
Chinese Application No. 201110271177.1 Second Office Action dated Jul. 15, 2013, 8 pages including partial English translation.

* cited by examiner

*Primary Examiner* — Glenn Dayoan
*Assistant Examiner* — Jason S Daniels

(57) ABSTRACT

A fairing unit (21) for enclosing a front portion of a vehicle body includes a fairing body (22) and a front edge member (23) mounted removably on the fairing body and forming a major component of a front edge of the fairing unit. The front edge member is made up of left and right front edge pieces (23a, 23b). A fairing assembly (43) includes the fairing unit and turn signal lamps (44A, 44B) mounted on the fairing body at a location rearwardly of the front edge member so as to protrude in a direction laterally outwardly thereof. The turn signal lamp is supported for collapsible movement in a direction laterally inwardly.

17 Claims, 11 Drawing Sheets

MOTORCYCLE FAIRING

CROSS REFERENCE TO THE RELATED APPLICATION

This application is based on and claims Convention priority to Japanese patent application No. 2010-206603, filed Sep. 15, 2010, the entire disclosure of which is herein incorporated by reference as a part of this application.

BACKGROUND OF THE INVENTION

1. Field of the Invention

The present invention relates to a fairing assembly for covering a front portion of a motorcycle.

2. Description of Related Art

The front fairing employed in most of the motorcycles currently in use is generally made of a synthetic resin and molded to varying shapes. For example, two-component type made up of left and right fairing segments and three-component type made of up left, center and right fairing segments are made available in recent years. Particularly where the fairing is desired to fit around a top portion of the front fork assembly, and be yet extended down to under the motorcycle engine, the three component type is largely employed, which is made up the a center fairing segment, designed as an upper fairing segment so as to enclose the instrument panel and the headlight unit, and left and right fairing segments designed to enclose generally opposite regions leftwardly and rightwardly of the front fork assembly and of the motorcycle engine.

The JP Laid-open Patent Publication No. 2005-153664 discloses a motorcycle fairing having ventilating windows, defined in respective side portions thereof generally rearwardly of the motorcycle radiator with respect to the direction of forward travel of the motorcycle, and left and right flappers for selectively opening or closing the ventilating windows in dependence with the wind pressure present inwardly of the fairing. According to the above mentioned patent publication, when the motorcycle is driven at high speed under severe heat condition, the flappers are moved to the open position to allow heats, evolving from the radiator, to be discharged from under a lower portion of the motorcycle and through the ventilating windows to thereby facilitate heat release from the radiator.

The motorcycle fairing is apt to get stained with mud, dirt and/or fugitive dust sloshed by the motorcycle front wheel during the travel of the motorcycle and/or to get tainted with small stones or any other particulate matters that are flipped by the revolving front wheel. Particularly when the fairing gets locally damaged with the paint coating locally stripped in contact with small stones, the appealing appearance of the motorcycle fairing comes to be spoiled. As a result, the damaged fairing is replaced with a new one requiring a substantial amount of cost.

In addition, the conventional motorcycle fairing of the three component type has left and right side fairing segments each having a smooth, streamlined outer surface (a surface facing outwardly of the fairing with respect to the motorcycle body) ranging from a front edge to a rear edge thereof. The wind incoming to the motorcycle, while the latter is travelling, impinges upon such outer surface of the respective side fairing segment and then flows along such outer surface in a direction rearwardly of the motorcycle and, therefore, a relatively large frictional resistance is developed between the incoming wind and the outer surface of the respective fairing segment.

On the other hand, since the motorcycle fairing disclosed in the above mentioned patent publication has built therein the ventilating system comprised of a combination of the ventilating windows and the flappers for selectively opening or closing the respective fairing windows so that heat evolved inwardly of the fairing can be released away from the motorcycle, the fairing as a whole requires a complicated structure and is indeed costly.

DISCLOSURE OF THE INVENTION

In view of the foregoing, the present invention has been devised with a view to providing a vehicle fairing unit of a kind, in which only one or more portions of the fairing stained or otherwise impaired during the travel of the vehicle can be replaced easily and, also, in which the appearance of the fairing unit can be changed according to the desire of a motorcycle rider or driver.

In order to accomplish the foregoing object of the present invention, there is provided a fairing unit for a motorcycle, which includes a fairing body and a front edge member removably mounted on the fairing body and forming a principal component of a front edge of the fairing unit. It is to be noted that the passage "principal component of a front edge of the fairing unit" means a portion which occupies more than a half of the front edge of the fairing unit.

According to this construction, the front edge portion of the fairing unit, which is susceptible to impairment or otherwise damage, is formed by the front edge member that is removably mounted on the fairing body. Accordingly, while the fairing body is left untouched, only the front edge member that is impaired or otherwise damaged can be washed, repaired or otherwise replaced with a new one to allow the fairing unit to resume the original appearance and, therefore, the cost of repair can be reduced. Also, if, for example, the front edge member is colored in a color different from that of the fairing body and is then combined with the fairing body, the fairing unit having an appealing appearance that suits to the driver's liking can be obtained. In addition, if the front edge member is painted in a color deep as compared with the color of the fairing body, for example, black, any stain present can be rendered unnoticeable.

In one preferred embodiment of the present invention, the front edge member may include left and right front edge pieces positioned on respective sides of the fairing unit. By so doing, if one of the left and right side edge pieces is impaired or otherwise damaged, it is sufficient to wash, repair or replace such one of the left and right side edge pieces and, therefore, the replacement of component parts, for example, can be minimized to reduce the cost which would be incurred in repairing.

In another preferred embodiment of the present invention, the front edge member may extend down to a lower edge of the fairing unit. The lower edge portion of the fairing unit is particularly susceptible to impairment or damage caused by collision of small stones flipped by the motorcycle front wheel during the travel of the motorcycle and, therefore, the front edge member extending down to the lower edge of the fairing unit is effective to prevent the fairing body form being impaired or damaged and, hence, the cost incurred in to repair such as, for example, the necessity of replacing the impaired or damaged fairing body with a new one can be minimized to thereby reduce the repair cost.

In a further preferred embodiment of the present invention, the front edge member may made of a resin containing a coloring agent and the fairing body has an outer side surface painted to form a paint coating thereon. If the front edge member is made of the resin containing the coloring agent it can be manufactured inexpensively with the necessity of the painting process eliminated. Also, since even when small stones or any other particulate matters collide against the front edge member to damage the latter, the base color after molding remains as it stands, a painted surface will not fall off enough to expose the base surface to the outside such as occurring where the painting has been applied to the front edge member, and, accordingly, the appealing appearance will not be reduced considerably. On the other hand, while the fairing body is finished to have an outer surface that improves the appealing feature as a result of the fairing body having been painted, the impairment or damage tends to occur mainly in the front edge member and, therefore, a condition at the time of painting can be maintained. In view of this, the fairing unit above described is effective to suppress an undesirable reduction in the appealing feature during the prolonged period of use.

In a yet further preferred embodiment of the present invention, the front edge member may have an outer surface which has a rear edge displaced outwardly from a front portion of an outer surface of the fairing body. If the rear portion of the outer surface of the front edge member is so displaced as described above, an inwardly oriented step is formed between the rear edge of the outer surface of the front edge member and a front portion of the outer surface of the fairing body and, therefore, the incoming wind then flowing along the outer surface of the front edge member is detached from the fairing body in the presence of the step. As a result, not only can the frictional resistance developed between the incoming air and the fairing body be advantageously reduced, but also the possibility can be eliminated in which dust, for example, may deposit on the fairing body to spoil the latter or the fairing body may be damaged as a result of collision of the small stones.

In a yet further preferred embodiment of the present invention, a discharge port for discharging an air inside the front edge member therethrough to the atmosphere in proximity to a radiator may be defined between a rear edge portion of the front edge member and a front edge portion of the fairing body. The presence of the discharge port is effective to discharge therethrough the air, then heated as a result of heat exchange taking place in the radiator, smoothly to the atmosphere while securing a simplified structure.

According to the one aspect of the present invention, there is also provided a fairing assembly for the motorcycle, which includes a fairing unit described above, and a turn signal lamp fitted to the fairing body at a location rearwardly of the front edge member in the fairing body so as to protrude outwardly from the fairing body in a direction widthwise of the vehicle body, the turn signal lamp being supported for collapsible movement in a direction inwardly in the widthwise direction of the vehicle body.

Considering that the front edge member is generally smaller in size and lower in physical strength than the fairing body and often replaced if desired, it is difficult to fit the turn signal lamp to the front edge member. Accordingly, the turn signal member is to be fitted to the fairing body at a rear side rather than the front edge member. In this case, if such turn signal lamp is fitted flush in surface with the fairing body, it would be difficult to satisfy the statutory requirement concerning the angle of distribution of light emitted in a direction forwardly inwardly of the motorcycle. In contrast thereto, according to such one aspect of the present invention, where the turn signal lamp is fitted in the arrangement protruding laterally outwardly of the fairing body, the turn signal lamp can satisfy the above statutory requirement of light distribution. On the other hand, the turn signal lamp so protruding tends to receive a large external force in the event that the fairing body contacts a fixture such as, for example, a ground as a result of toppling of the motorcycle down to the ground. But in that event, the turn signal lamp is collapsed laterally inwardly of the motorcycle, when it receives the external force, to thereby absorb the external force, thus avoiding the possible impairment or damage.

In a preferred embodiment of the present invention according to the one aspect thereof, the turn signal lamp may be collapsible to a position flush with an outer side surface of the fairing body in the widthwise direction or to a position further inwardly of the first mentioned position. This is particularly advantageous that impairment of or damage to the turn signal lamp then receiving the large external force can be further effectively avoided.

In another preferred embodiment of the present invention according to the one aspect thereof, the turn signal lamp may be supported not to displace in a direction other than the widthwise direction of the vehicle body and prevented from moving in a direction inwardly of the widthwise direction of the vehicle body upon application of an external force lower than a predetermined allowable external force, but movable in the direction inwardly of the widthwise direction of the vehicle body upon application of the external force not lower than the predetermined allowable external force. According to this construction, under the normal condition the turn signal lamp can be prevented from displacing undesirably and can be held at a desirable position.

In a further preferred embodiment of the present invention according to the one aspect thereof, the fairing body may have a support piece by which a to-be-supported member integral or rigid with the turn signal lamp is supported, in which case the to-be-supported member is arranged at a location displaced from a radiator for dissipating from an engine cooling water in a longitudinal direction of the vehicle body. This is particularly advantageous that when the turn signal lamp collapses in a direction laterally inwardly, an undesirable collision of the turn signal lamp against the radiator of a relatively large width and the fixture can be avoided.

In a yet further preferred embodiment of the present invention according to the one aspect thereof, the turn signal lamp may be supported by the fairing body through an elastic member by means of a support element, in which case the elastic member is so set as to move in a direction inwardly of a widthwise direction of the vehicle body relative to the support element to thereby allow the turn signal lamp to retract in the direction inwardly of the widthwise direction, when an external force not lower than a predetermined allowable external force acts on the turn signal lamp. This structural feature is effective to allow the turn signal lamp to be smoothly collapsed in a direction laterally inwardly of the motorcycle by the effect of an elastic deformation taking place in the elastic member.

In a yet further preferred embodiment of the present invention, particularly where the turn signal lamp is supported by the fairing body through the elastic member by means of the support element, the support element referred to above may include a fastening member fastened to a boss of the fairing body, in which case the elastic member has an insertion hole defined at a center portion thereof and the turn signal lamp is supported by the fairing body with the fastening member passed through the insertion hole and with a head of the fastening member urging the elastic member against the boss. According to this structural feature, since the elastic member having the insertion hole defined at a center portion thereof, into which the fastening member is passed, is urged towards the boss by the head of the fastening member fastened to the boss of the fairing member, under the normal condition the turn signal lamp is stably held at a predetermined mounting position.

In a yet further preferred embodiment of the present invention, particularly where the turn signal lamp is supported by the fairing body through the elastic member by means of the support element, the turn signal lamp may have a support hole and the elastic member may be of a substantially cylindrical configuration having its outer periphery formed with an engagement groove in which an inner peripheral edge of the support hole in the turn signal lamp is engageable, in which case the head of the fastening member is smaller than the inner diameter of the support hole and greater than the inner diameter of the insertion hole in the elastic member. Under the normal condition, the elastic member is urged toward the boss of the fairing body by the head of the fastening member having an outer diameter greater than the inner diameter of the insertion hole in the elastic member, and, at this time, the turn signal lamp is supported stably by the fairing body by means of the fastening member through the elastic member with an inner peripheral edge around the support hole engaged in the engagement groove in the outer periphery of the elastic member.

As described above, the inner peripheral edge around the support hole in the turn signal lamp is engaged in the engagement groove in the elastic member as described above, and accordingly, in the event that the turn signal lamp is acted upon by the external force in a direction laterally inwardly of the motorcycle, the elastic member is urged through the inner peripheral edge portion around the support hole in response to the external force so acting on the turn signal lamp to thereby undergo an elastic deformation. If the external so applied to the turn signal lamp is higher than an external force permissible to the elastic member, the elastic member of the cylindrical configuration undergoes the elastic deformation to get away from the head of the fastening member and, in dependence thereon, the turn signal lamp is detached from the head of the fastening member because of the support hole having a diameter greater than the outer diameter of the head of the fastening member. As a result, an undesirable impairment of or damage to the turn signal lamp can be avoided.

In a yet further preferred embodiment of the present invention, particularly where the turn signal lamp is supported by the fairing body through the elastic member by means of the support element, the turn signal lamp may have a flange defined at plural portions thereof, in which case the turn signal lamp is fitted to the fairing body by means of the support member that is inserted in each of the flanges. Since the turn signal lamp is fitted to the fairing body with the support element inserted in the flange defined at a plural portions thereof, the turn signal lamp can be stably held at the predetermined position under the normal condition.

According to a second aspect of the present invention, there is provided a fairing assembly for a motorcycle, which includes a fairing unit for enclosing a front portion of a vehicle body; and a turn signal lamp fitted to the fairing unit so as to protrude from the fairing unit in a direction laterally outwardly of the vehicle body. This turn signal lamp is supported for collapsible movement in a direction inwardly of the width of the vehicle body. Even in the case of employing the fairing which does not make use of the front edge member, when the turn signal lamp is provided in an arrangement protruding in a direction laterally outwardly from the fairing, the fairing body may contact a fixture such as, for example, a ground as a result of, for example, toppling of the motorcycle down to the ground and the turn signal lamp may then receive a large external force. At that time, according to the second aspect of the present invention, the turn signal lamp can, upon receipt of such an external force, collapse in a direction laterally inwardly of the motorcycle to thereby absorb the external force and, therefore, an undesirable impairment or damage can be avoided.

It is to be noted that the present invention should be understood as encompassing any combination of at least two of constructions set forth in the claims and/or the specification and/or the accompanying drawings. In particular, the present invention should be construed as encompassing any combination of two or more of the elements set forth in the appended claims.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF PREFERRED EMBODIMENTS

A preferred embodiment of the present invention will now be described in detail with particular reference to the accompanying drawings.

Figure 1:
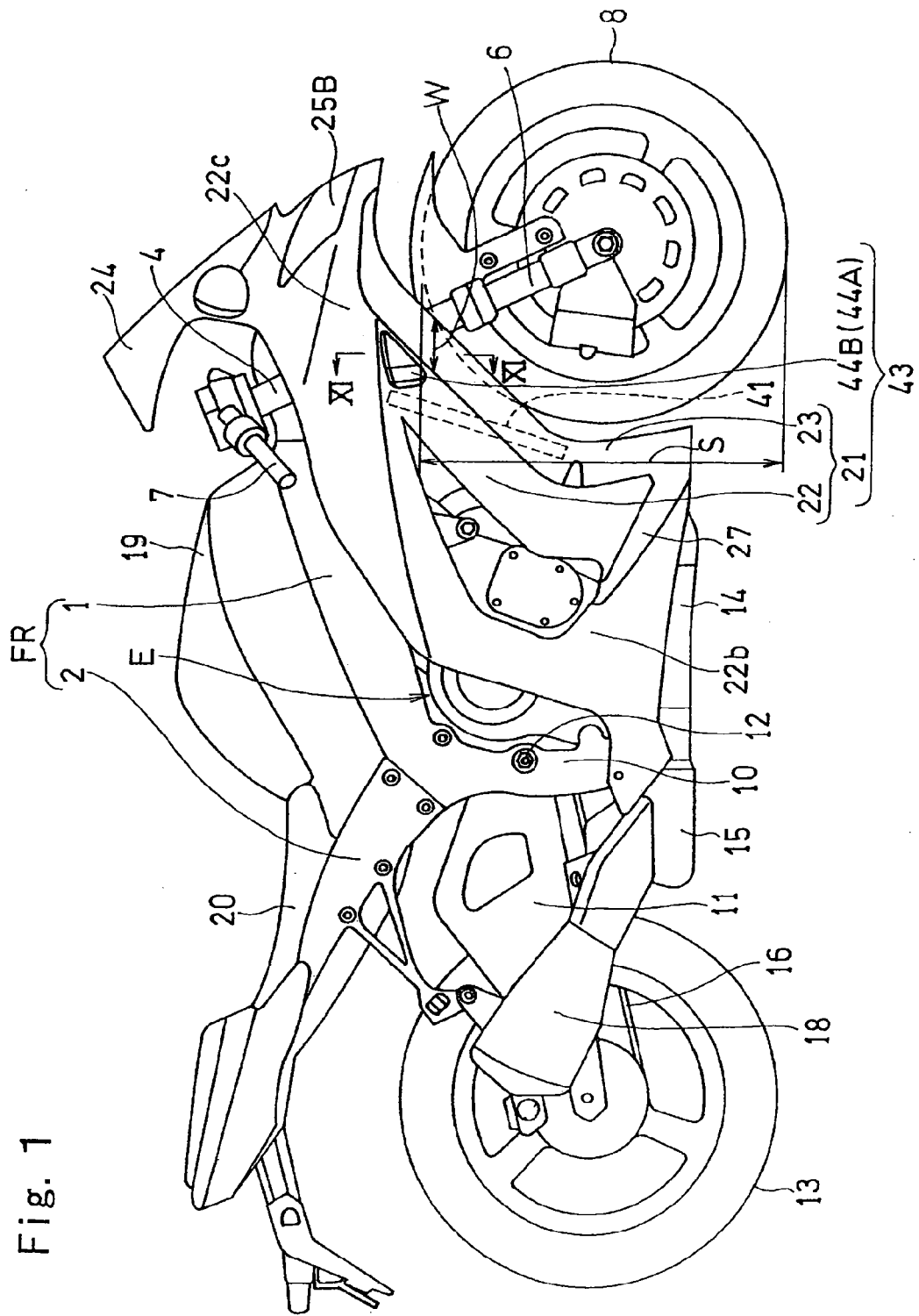
FIG. 1 is a side view showing a motorcycle on which a motorcycle fairing unit designed in accordance with a preferred embodiment of the present invention is mounted.

Referring to FIG. 1 which shows a schematic side view of a motorcycle having mounted thereon a motorcycle fairing unit designed in accordance with the preferred embodiment of the present invention, the illustrated motorcycle includes a motorcycle frame structure FR made up of a front frame section, including a main frame 1, and a rear frame section including a rear frame 2 coupled with a rear portion of the main frame 1. The main frame 1 has a head block 4 mounted on a front end portion of thereof, and a steering shaft (not shown) is rotatably supported by the head block 4. A front fork 6 having a front wheel 8 rotatably carried by and at a lower end thereof is rotatably supported the head block 4 through the steering shaft. A motorcycle steering handlebar 7 is mounted on an upper end of the front fork 6 for angular movement together with the front fork 6.

A swingarm bracket 10 is positioned in a lower intermediate portion of the motorcycle frame structure FR and secured to a lower end portion of the main frame 1, and a swingarm 11 having a rear drive wheel 13 rotatably supported at and by a rear end thereof is pivotally connected at a front end thereof with the swingarm bracket 10 through a pivot pin 12 for movement up and down about such pivot pin 12. A motorcycle combustion engine E is mounted on the lower intermediate portion of the motorcycle frame structure FR and positioned forwardly of the swingarm bracket 10 with respect to the direction of travel of the motorcycle. As a matter of course, the combustion engine E is used to drive the rear drive wheel 13 through a drive transmission element such as, for example, a propeller shaft or a substantially endless chain or belt 16. For the combustion engine E, a water cooled, four cycle combustion engine may be employed. Exhaust gases emitted from the combustion engine E in any known manner are discharged into an exhaust system including an exhaust pipe 14, extending downwardly and rearwardly from the combustion engine E, by way of an exhaust chamber 15, which is positioned below the combustion engine E and are finally discharged to the atmosphere through a muffler 18 positioned in the rear section of the vehicle body and fluid coupled with the exhaust chamber 15.

A fuel tank 19 containing an amount of fuel therein is mounted on the motorcycle frame structure FR at a location above the main frame 1 and a motorcycle rider's seat assembly 20 is mounted on an upper portion of the rear frame 2 at a location rearwardly of the fuel tank 19. A motorcycle radiator 41 for liberating heats evolved in a coolant water used to cool the combustion engine E is fixedly supported by the main frame 1 at a location generally between the front wheel 8 and the combustion engine E.

The fairing unit, generally identified by 21, for enclosing a front portion of the body of the motorcycle for the purpose well known to those skilled in the art and motorcycle fans is mounted in part on the upper end of the front fork 6 so as to enclose a region ranging from the upper end portion of the front fork 6 down to laterally of the combustion engine E, with its lower portion terminating at a location sufficient to enclose a bottom portion of the combustion engine E and a portion of the exhaust tube 14 from sideways.

The fairing unit 21 referred to above includes a fairing body 22 supported by the main frame 1 and front edge members 23 removably mounted on a front edge portion of the fairing body 22 and forming a major component at the front edge of the fairing unit 21. The fairing body 22 is made up of left and right side fairing segments 22a and 22b and a center fairing segment 22c positioned above the left and right side fairing segments 22a and 22b. A windshield screen 24 is mounted atop the center fairing segment 22c. The term "left and right" similarly used hereinabove and hereinafter is to be understood as relative term description of positions and/or direction as viewed from a motorcycle rider occupying the seat during the forward travel of the motorcycle.

Figure 2:
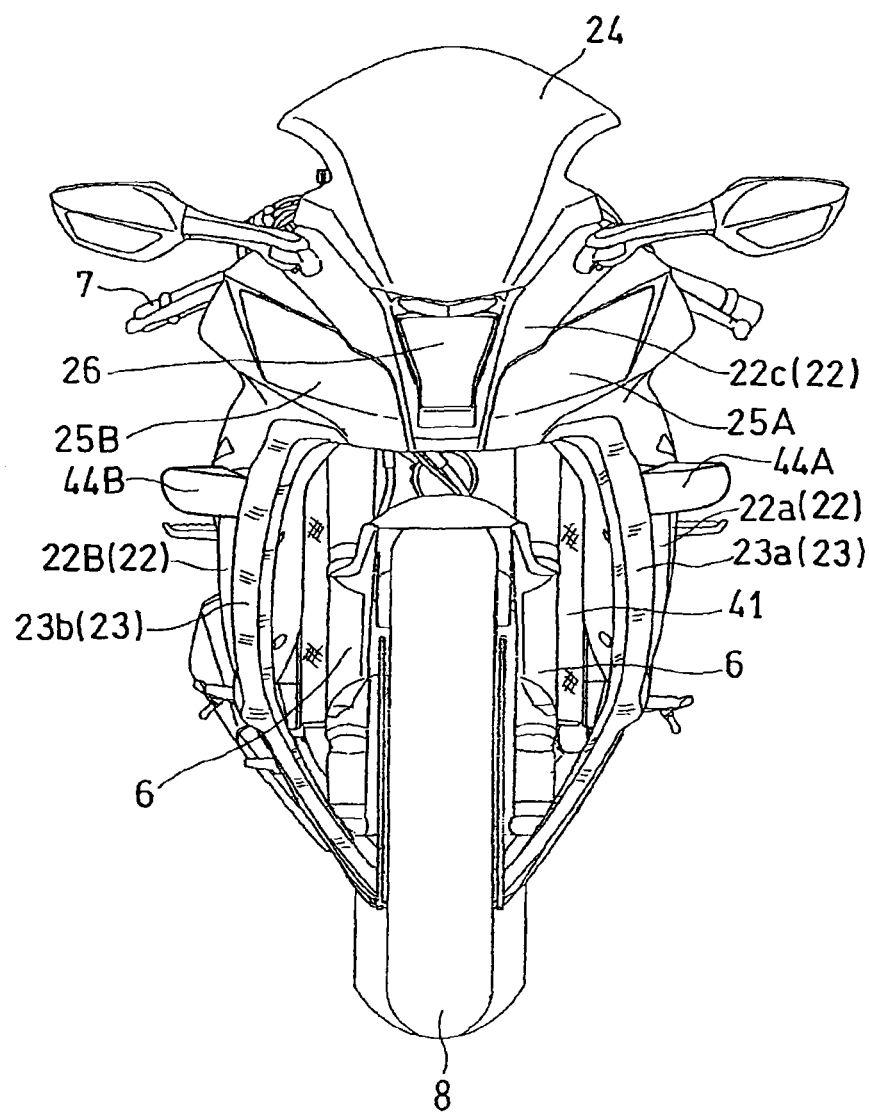
FIG. 2 is a front elevational view showing the motorcycle.

As best shown in FIG. 2, the front edge members 23 are made up of elongated, left and right front edge pieces 23a and 23b positioned leftwards and rightwards of the fairing unit 21, respectively. Those elongated, left and right front edge pieces 23a and 23b are mounted on the fairing body 22 so as to enclose the entire front edges of the left and right side fairing segments 22a and 22b and opposite side portions which form respective parts of a front edge of the center fairing segment 22a. The left and right front edge pieces 23a and 23b so mounted on the fairing body 22 are independently removable relative to the fairing body 22.

Each of the front edge pieces 23a and 23b forming the respective front edge members 23 is, as best shown in FIG. 1, positioned at a front end of a portion of the fairing body 22 located at least in a rear region S rearwardly of the front wheel 8. Accordingly, the front edge members 23 have respective top ends thereof held at a level substantially in flush with or slightly below the level of the top of the front wheel 8. Also, each of the front edge members 23 has a portion thereof positioned forwardly of the radiator 41 and a major portion positioned rearwardly of the front wheel 8. In other words, each of the front edge members 23 is disposed between the fairing body 22 and the front wheel 8. A laterally outer surface of each of the front edge members 23 in a direction widthwise of the motorcycle body best shown in FIG. 2 extends rearwardly downwardly from a front end portion (top portion) thereof to rear end (a lower end) portion thereof with a generally intermediate portion thereof bulged laterally outwardly.

The front edge members 23 and the fairing body 22 are made of respective materials different from each other. In the illustrated embodiment, the front edge members 23 are made of polypropylene whereas the fairing body 22 is made of an ABS resin (a copolymer of acrylonitrile, butadiene and styrene). The use of the different materials for the front edge members 23 and the fairing body 22 allows the front edge members 23 to be manufactured with a use of a less costly material particularly where one or both of the front edge members 23 are regarded as less vulnerable or as an expandable component that can be disposed of upon replacement with a new one.

The center fairing segment 22c intervening substantially between the left and right side fairing segments 22a and 22b have respective headlights 25A and 25B mounted thereon, and a portion of this center fairing segment 22c intermediate between the left and right headlights 25A and 25B has an air intake 26 defined therein for allowing a portion of the incoming wind to be used as an air to be mixed with a fuel for combustion within the combustion engine E.

Figure 3:
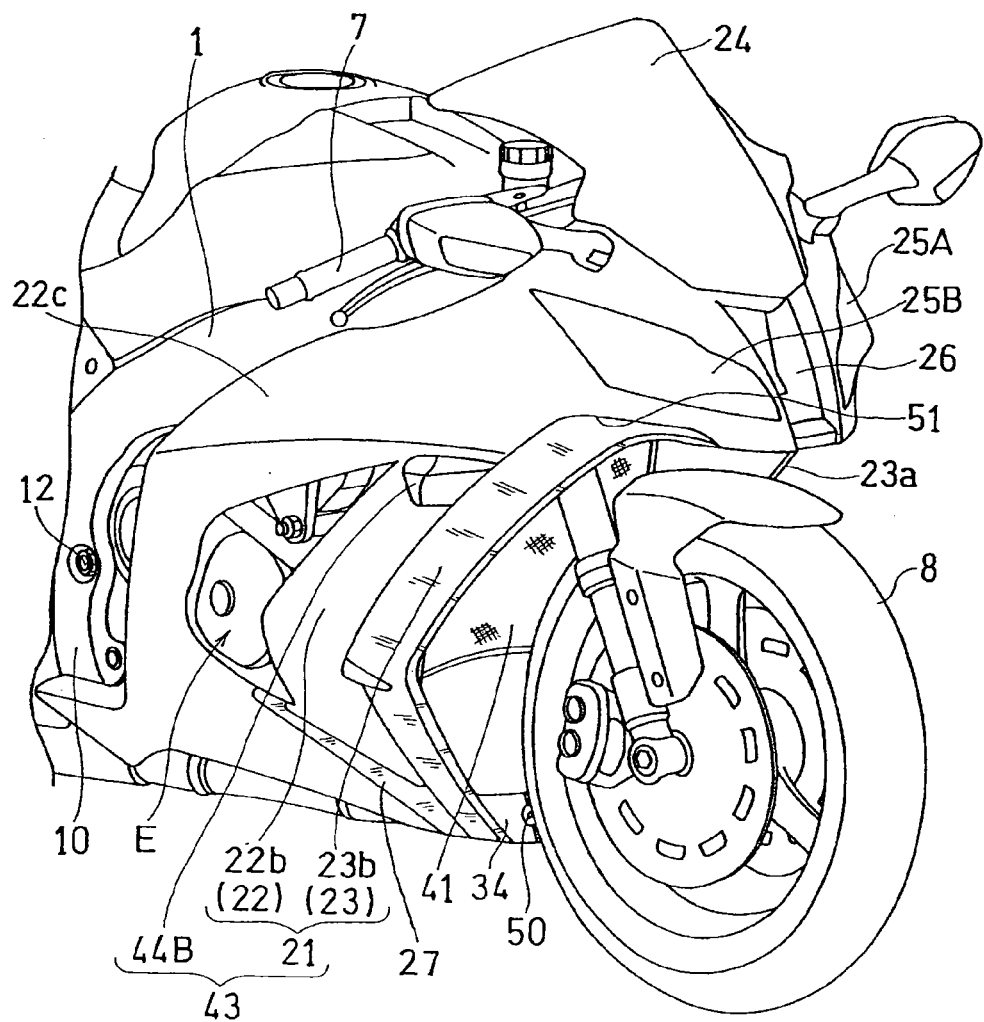
FIG. 3 is a perspective view showing a front portion of the motorcycle.
Figure 4:
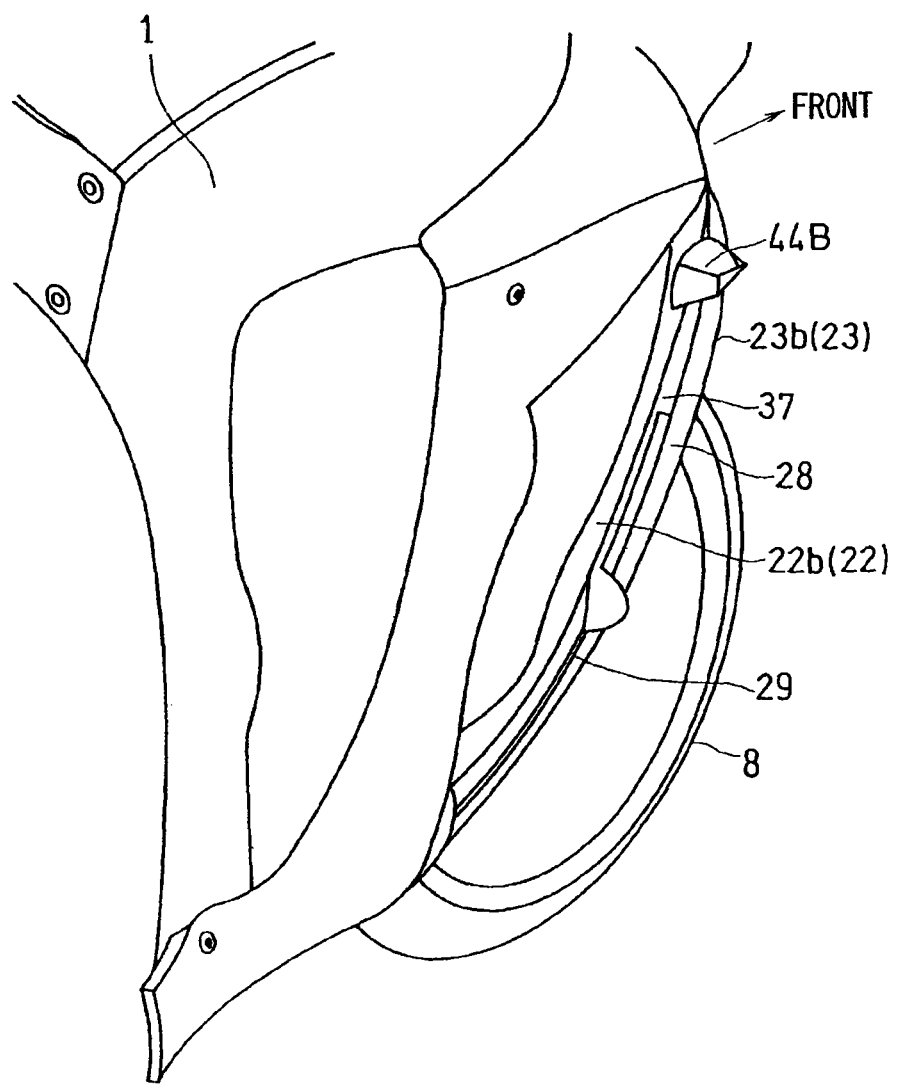
FIG. 4 is a perspective view showing a front side portion of the motorcycle as viewed diagonally from rear to show how the fairing unit is mounted.
Figure 5:
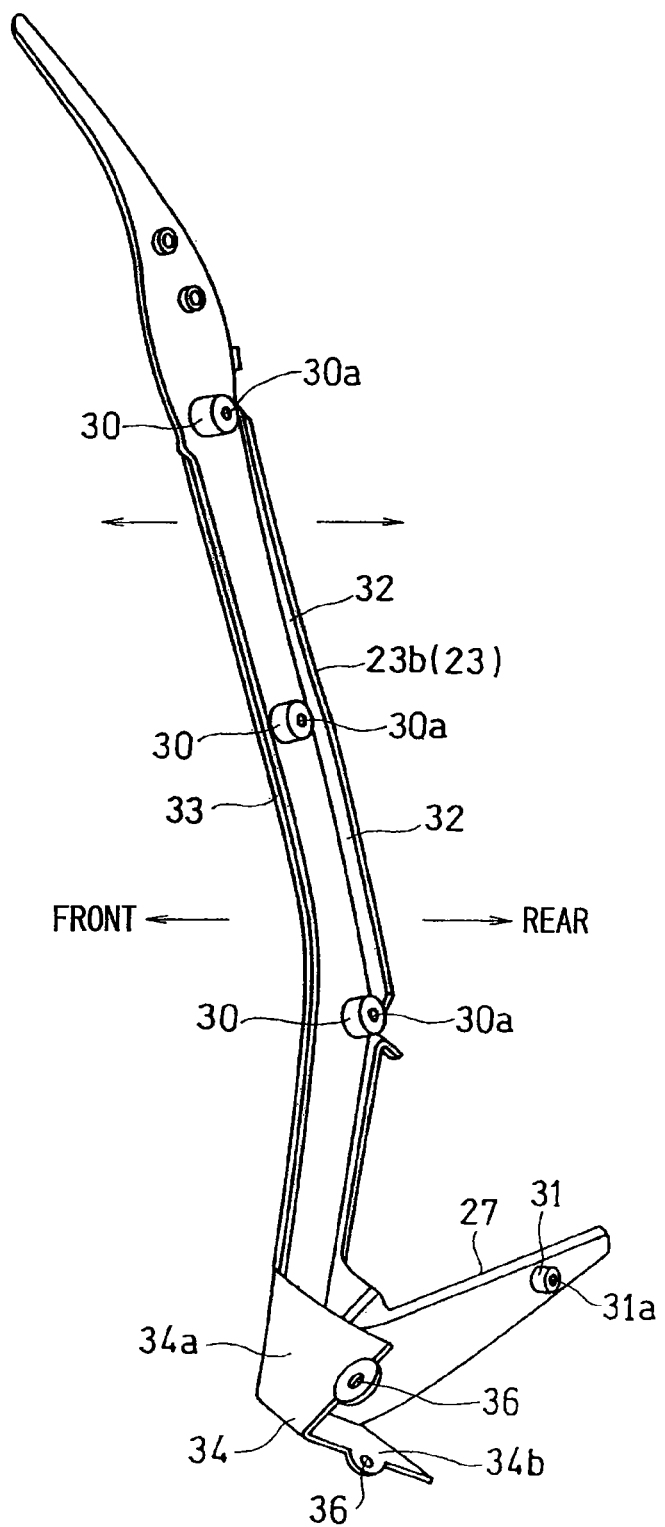
FIG. 5 is a perspective view showing, on an enlarged scale, one of elongated front edge segments of front edge members, i.e., a front right edge segment of a front right edge member as viewed diagonally forwardly from the inside.

As best shown in FIG. 3, each of the front edge pieces 23a and 23b of the front edge members 23 is so shaped as to have a lengthwise intermediate portion thereof substantially bent to represent a generally V-shaped configuration, with its lengthwise intermediate portion opening forward and located laterally outwardly of the motorcycle body. Specifically, each of the front edge pieces 23a and 23b has a lower end extended down to a lower edge of the fairing unit 21 and is provided with a fin 27 that extends rearwardly from the lower end thereof. It is noted that FIGS. 4 and 5 illustrate only one of the front edge pieces, for example, the right front edge piece 23b for the purpose of convenience as the left and right front edge pieces 23a and 23b are of an identical structure. As best shown in FIG. 4 illustrating a right side of the right front edge piece 23b as a representative, a rear edge 28 of the right front edge piece 23b is offset outwardly relative to a front portion 29 of an outer surface of the adjacent side fairing segment 22b so as to define a corresponding step 37 between the respective rear edge 28 and the front portion 29 of the outer surface of the adjacent side fairing segment 22a and 22b. The details of the step 37 in each of the left and right front edge members 23 will be described later.

As explained above, FIG. 5 illustrates the right front edge pieces 23b. The left front edge piece 23a is of the identical, but symmetrical structure with the right front edge piece 23b.

The right front edge piece 23b in its entirety is of an elongated strip-like shape having its inner surface side formed with a plurality of, for example, three, front edge bosses 30 each having a threaded hole 30a defined therein for receiving a corresponding tapping screw as will be described later. The fin 27 secured to the lower end of the front edge piece 23b has its inner surface side formed with at least one front edge boss 31 similarly having a threaded hole 31a defined therein for receiving a tapping screw as will be described later. A portion of the front edge piece 23b except for an upper portion thereof has its rear edge formed with a bent piece 32 extending inwardly at right angles thereto. In the other hand, the front edge piece 23b has a front edge formed integrally with a front edge guide 33 that is curved inwardly. It is noted that the shape of the front edge guide 33 will be described later.

Other than the fin 27 referred to above, the front edge piece 23b has a lower end portion formed with a coupling segment 34 of a generally V-shaped configuration opening in a direction rearwardly of the vehicle body. This coupling segment 34 is made up of an upper plate and a lower plate connected at angles relative to each other; the upper plate defining a first guide member 34a for guiding the incoming wind in a direction diagonally upwardly, and the lower plate defining a second guide member 34b for guiding the incoming wind in a direction diagonally downwardly. Those first and second guide members 34a and 34b have respective insertion holes 36 and 36 defined therein for receiving corresponding fastening elements 50, which may include bolts and nuts, that are used to connect respective lower end portions of the right front edge piece 23b and the left front edge piece 23a together.

The first guide member 34a, which is a portion susceptible to collision with small stones during the travel of the motorcycle, is formed in the front edge member 23 and is therefore readily removable together with the front edge member 23 from the fairing body 22. Accordingly, if the first guide member 34a is stained or otherwise impaired as a result of collision with small stones and is thence desired to be replaced, the front edge member 23 including the first guide member 34a can be easily replaced with a new one. Also, the lower end portion of the front edge member 23 has a longitudinal dimension greater than that of a vertically intermediate portion thereof by a quantity corresponding to a breadth occupied by the respective fin 27 and, therefore, the lower end portion of the front edge member 23, which is held in relatively close vicinity of the road surface and is therefore susceptible to stains, can be easily replaced with a new one or washed so that the relevant front edge member 23 can regain an appealing condition if it be replaced with a new one or the stained lower portion is washed or otherwise repaired.

Figure 6:
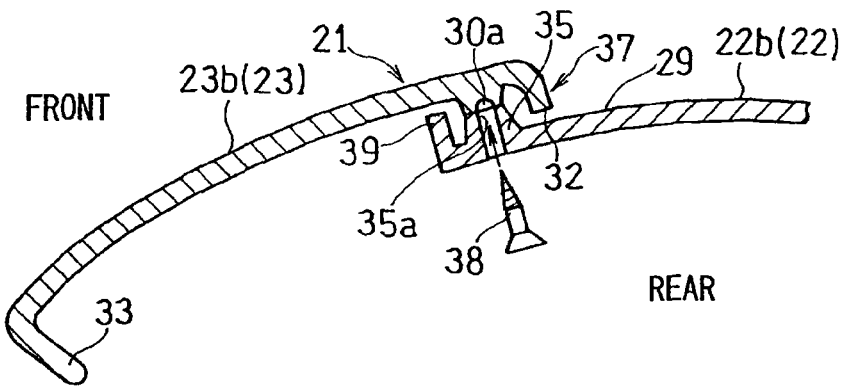
FIG. 6 is a horizontal sectional view showing how the fairing unit is fitted.

Referring now to FIG. 6, when the three front edge bosses 30 formed in the right front edge piece 23b of the front edge member 23 are aligned with respective body bosses 35 that are formed in corresponding portions of the right side fairing segment 22b and respective tapping screws 38 are subsequently threaded into the threaded holes 30a in the associated bosses 30 through insertion holes 35a defined in the body bosses 35, the right front edge piece 23b of the front edge member 23 is connected with the right side fairing segment 22b. An upper portion of the front edge piece 23b is merely engaged into a recess 51, defined in a side portion of the front edge of the center fairing segment 22c as best shown in FIG. 3 to thereby connect it with the center fairing segment 22c. The left front edge piece 23a of the front edge member 23 is also coupled with the left side fairing segment 22a and the center fairing segment 22c in a manner similar to that described above in connection with the right front edge piece 23b.

It will readily be understood that the fairing unit 21 is of such a design that when the tapping screws 38 are unfastened, the front edge member 23 can be removed from the fairing body 22 and a fresh front edge member 23, which superseded the removed front edge member 23, can be secured to the fairing body 22 with the tapping screws 38 again fastened.

It is to be noted that the fairing unit 21 referred to above may be mounted on the motorcycle frame structure FR so as to enclose the front portion of the motorcycle in a condition with the left and right edge pieces 23a and 23b removably fitted to the fairing body 22. Alternatively, the left and right front edge pieces 23a and 23b may be removably mounted on the fairing body 22 then mounted on the motorcycle frame structure FR.

Figure 7:
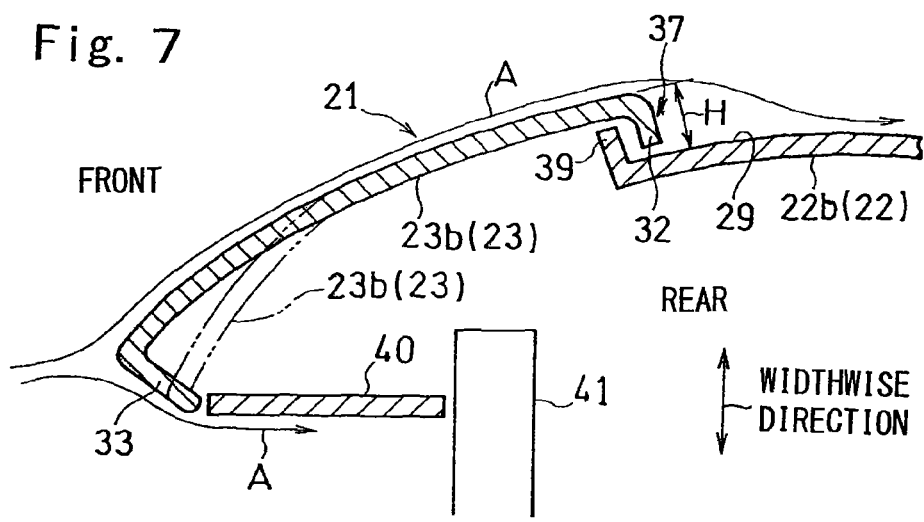
FIG. 7 is a horizontal sectional view showing a portion of the fairing unit.

As shown in FIG. 7, the front edge member 23 has a rear end formed integrally with the bent piece 32 so as to extend therefrom in a direction perpendicularly inwardly and, on the other hand, the fairing body 22 has a front end formed integrally with a counter bent piece 39 so as to extend therefrom in a direction perpendicularly outwardly, with the bent piece 32 of the front edge member 23 positioned so as to extend parallel to the counter bent piece 39 of the fairing body 22. A rear edge of an outer surface of the front edge member 23 adjacent the bent piece 32 thereof is placed having been displaced from the front portion 29 of an outer surface of the fairing body 22 adjacent the counter bent piece 39 thereof in a direction outwardly thereof. In other words, the step 37 of a height, indicted by H, as measured in a direction leftwards and rightwards is defined in a space delimited between the rear edge of the outer surface of the front edge member 23 and the front portion 29 of the outer surface of the fairing body 22. Accordingly, the incoming wind A flowing along the outer surface of the front edge member 23 can be detached from the fairing body 22 in the presence of the step 37 so as not to flow along the outer surface of the front portion 29 of the fairing body 22 and, therefore, the frictional resistance of the incoming wind A relative to the fairing body 22 can be reduced. Also, the presence of the step 37 is effective to suppress an undesirable deposit of dusts and/or dirt on the outer surface of the fairing body 22, which would leads to the fairing body 22 being stained or otherwise spoiled, and also a collision of small stones or any other particulate matter against the fairing body 22.

In order to secure the various advantages afforded by the present invention as hereinabove described, the height H of the step 37 is preferably within the range of 10 to 25 mm and, more preferably, within the range of 15 to 20 mm. Also, the width of the front edge member 23 as measured in a direction forwards and rearwards, as indicated by W in FIG. 1, is, if set to a value within the range of 100 to 200 mm, desirable to effectively avoid disfeature, deterioration or fracture of the fairing body 22.

The front edge guide 33 of the front edge member 23 shown in FIG. 7 is so formed as to represent a shape bent at a portion adjacent a front end thereof to extend in a direction diagonally inwardly of the front edge member 23, terminating at a location adjacent a front end of an inner fairing member 40 with a gap defined between it and the inner fairing member 40. The inner fairing member 40 referred to above has opposite longitudinal ends fitted to the front edge guide 33 of the front edge member 23 and the radiator 41 by means of a suitable fitting section. The front edge guide 33 so shaped and so positioned as hereinabove described serves to efficiently guide the incoming wind A, then flowing from forwardly of the motorcycle, in a direction inwardly to allow it to smoothly flow into the radiator 41 through the inner fairing member 40.

Figure 8:
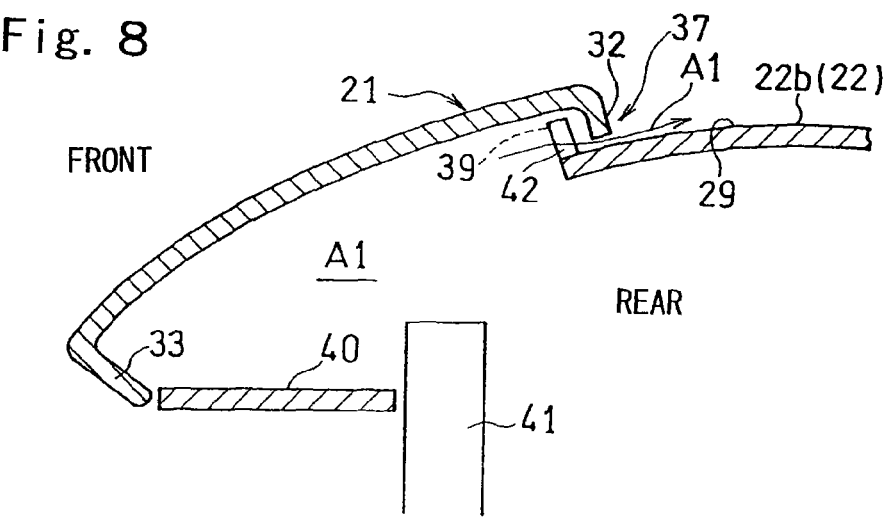
FIG. 8 is a horizontal sectional view showing a portion of the fairing unit proximate to a motorcycle radiator.

FIG. 8 illustrates a horizontal section of the right side fairing segment 22b and the right front edge piece 23b in the vicinity of the radiator 41. At a portion of the fairing body 22 generally in level with the top of the radiator 41, the fairing body 22 is formed with a substantially slot shaped discharge port 42 defined between the rear edge portion of the front edge member 23 and the front edge portion of the fairing body 22 by depleting a portion of the bent piece 39. This discharge port 42 is used to smoothly discharge the incoming wind A1, which has been heated as a result of the heat exchange taking place in the radiator 41 and is likely to stagnate laterally of the radiator 41, and the heated incoming wind A1 having been discharged from the discharge port 42 is in turn discharged to the atmosphere through the gap delimited between a tip of the bent piece 32 of the front edge member 23 and the outer surface of the fairing body 22. Thus, with the heated air present around the radiator 41 discharged to the atmosphere, an undesirable increase of the temperature in the radiator 41 can be suppressed.

As hereinabove described, according to the foregoing embodiment, the front edge portion of the fairing unit 21, which is mainly apt to be damaged or otherwise fractured, is formed in the front edge member 23, which is a separate member from the fairing body 22, and is removably mounted on the fairing body 22. Accordingly, when the front edge member 23 is damaged or fractured, only the front edge member 23 may be washed, repaired or replaced with a new front edge member, while leaving the fairing body 22 untouched, to recover an appearance of the motorcycle. Also, if the front edge member 23, which is a member separate from the fairing body 22, is combined with the fairing body 22 of a color different from that of the front edge member 23, and vice versa, the fairing unit 21 of an appearance that suit to the rider's liking can be obtained. Yet, if the front edge member 23 is colored in a deep color such as, for example, black, such an advantage can be obtained that a smudge, if appearing on the front edge member 23, would not become noticeable.

The fairing unit 21 of the structure described above is such that the front edge members 23, which are members separate from the fairing body 22, are mounted on the fairing body 22 and, therefore, development of a model, which can meet the customer's needs, can be efficiently carried out merely by changing only the front edge member 23, if various front edge members 23 of different shapes as shown by the double dotted lines in FIG. 7 are mounted on the same fairing body 22 and a series of experiment on the frictional resistance of the incoming wind are carried out.

Also, as shown in FIG. 2, the front edge members 23 includes the left and right front edge pieces 23a and 23b that are separate from each other and positioned on the opposite side portions of the fairing unit 21. Accordingly, in the event that only one of the left and right front edge pieces 23a and 23b is impaired or otherwise damaged, it is sufficient that such one of the front edge pieces 23a and 23b be washed, repaired or replaced and, hence, replacement of component parts can be minimized to allow the cost incurred in repair to be reduced.

In addition, as clearly shown in FIG. 3, the front edge members 23 extend down to the lower edge of the fairing unit 21. While respective lower end portions at the front edge of the fairing unit 21 are apt to be fractured or otherwise damaged as a result of collision with small stones flipped by the front wheel 8, extension of the front edge members 23 down to the lower edge of the fairing unit 21 allows most of the fractures or damages to occur in the front edge members 23, leaving the lower portion of the fairing body 22 free from such fractures or damages. Accordingly, replacement of component parts of the fairing unit 21 can be minimized to allow the cost incurred in repair to be reduced.

In the embodiment now under discussion, each of the front edge members 23 is made of a resinous material such as, for example, polypropylene, added with a coloring agent, by the use of any known molding technique and is then, i.e., after the manufacture thereof, subjected to a texturing process or an etching process to provide a satin finished surface having a multiplicity of minute surface irregularities. Accordingly, the respective front edge member 23 so manufactured and so treated has its surface colored by the coloring agent, which has been added in the material surface, and requires no painting process, which would be otherwise required after the manufacture, thus allowing the front edge member 23 to be manufactured inexpensively and at a cost reduced by the otherwise required painting expense. Since after the manufacture thereof the front edge member 23 has its surface representing the base material color by the coloring agent used as hereinabove described, there is no possibility that even when small stones or any other particulate matters collide against the front edge member 23 to damage the latter, a painted surface will not fall off enough to expose the base surface to the outside such as occurring where the painting has been applied to the front edge member. Accordingly, an undesirable reduction in appealing appearance can be suppressed for a substantial period of time of use.

Also, since each of the front edge members 23 has its surface satin finished, not only is the respective front edge member 23 less susceptible to a taint, but also rays of light impinging on the surface of the front edge member 23 are readily reflected enough to render the taints to be less noticeable. On the other hand, while the fairing body 22 is generally finished by painting to have a beautiful and appealing outer surface, such appealing outer surface of the fairing body 22 can be maintained for a substantial period of time as the front edge members 23 so manufactured and so treated as hereinabove described are effective to prevent the fairing body 22 from being spoiled or otherwise damaged. Accordingly, an undesirable reduction in appealing feature of the fairing unit 21, which would otherwise occur when it is used for a prolonged time, can be further suppressed.

Since the fairing unit 21 of this embodiment is such that the step 37 is formed inwardly between the rear edge of the outer surface of each of the front edge members 23 and the front portion of the outer surface of the fairing body 22 as shown in and described with particular reference to FIG. 7, the incoming wind A then flowing along the outer surface of the respective front edge member 23 can be detached from the fairing body 22 in the presence of such step 37. As a result thereof, not only can the frictional resistance developed between the fairing body 22 and the incoming wind A be reduced, but also deposition of dust or the like on the fairing body 22 and/or collision of small stones or any other particulate matters against the fairing body 22, which eventually result in taints, can be suppressed.

Also, since the discharge port 42 is formed between the rear edge portion of the respective front edge member 23 and the front edge portion of the fairing body 22 for discharging the air A1, then inwardly of each of the front edge members 23 in the vicinity of the radiator 41 to the outside, the air A1 of a high temperature around the radiator 41 can be smoothly discharged from inside of the fairing unit 21 to the external atmosphere.

It is to be noted that the present invention although having been shown and described as applied to the motorcycle of a type provided with the fairing, can be equally applied to any other motorcycle, provided that the fairing is used therein, or a motorcycle utilizing an electrically operated motor as a motive power. Although the motorcycle, to which the present invention is applicable, is preferably of a type utilizing a fully enclosing fairing such as shown in and described in connection with the preferred embodiment of the present invention, the effects afforded by the present invention can be equally obtained even with a motorcycle employing a half-fairing or a bikini fairing.

In addition, although in describing the preferred embodiment of the present invention, reference has been made to the front edge member 23 of a two component structure made up of the left and right front edge pieces 23a and 23b, it may be further fractioned so render them to be removably mounted on the fairing body, or the left and right members may be integrated or formed in a unitary structure. By way of example, the lower end portion of the front edge member 23, which is susceptible to taint or any other impairment, may be separated from the other portion and may be separately detachably fitted to the fairing body 22.

The left and right side fairing segments 22a and 22b, forming respective parts of the fairing body 22 of the fairing assembly 21 shown in FIG. 1, has left and right turn signal lamps 44A and 44B fixedly mounted thereon in proximity to each other to thereby complete a fairing assembly 43 to which the present invention pertains. As hereinabove described, the major portion of the front edge of the fairing unit 21 is formed by the front edge members 23, which are generally smaller, and have a physical strength lower, than the fairing body 22 and, also, which can be replaced with a new one if desired. For this reason, mounting of a turn signal lamp system 44, made up of the left and right turn signal lamps 44A and 44B, on the front edge members 23 are undesirable.

In view of the above, the fairing assembly 43 includes the left and right turn signal lamps 44A and 44B fixedly mounted on the left and right side fairing segments 22a and 22b of the fairing body 22 at respective locations rearwardly of the front edge pieces 23a and 23b. Where the left and right turn signal lamps 44A and 44B are mounted on respective portions of the fairing body 22 rearwardly of the front edge members 23 of the fairing unit 21, in order to satisfy the statutory requirement concerning the pattern of distribution of light emitted from each of the turn signal lamps 44A and 44B, they must be disposed at respective positions where they can protrude a relatively large distance outwardly from the side fairing segments 22a and 22b in a direction widthwise of the motorcycle body.

Considering that each of the turn signal lamps 44A and 44B, which are mounted on the fairing body 22 at such respective positions where they can protrude a relatively large distance outwardly from the side fairing segments 22a and 22b, is susceptible to a large external force in contact with a fixture, the respective turn signal lamp 44A and 44B is supported by the associated side fairing segment 22a and 22b for collapsible movement in a direction inwardly of the width of the motorcycle body, when they receive such an external force, to thereby avoid the possible impairment or damage.

The left and right turn signal lamps 44A and 44B, which are of a symmetrical shape relative to each other, are fitted to the respective side fairing segments 22a and 22b by the use of the same fitting structure. The mounting manner of the turn signal lamps 44A and 44B will now be described in detail, noting that since for the purpose of clarity and a better understanding of the present invention, reference will be made only to one of the turn signal lamps, for example, the right turn signal lamp 44B mounted on the right side fairing segment 22b, unless otherwise specified.

Figure 9:
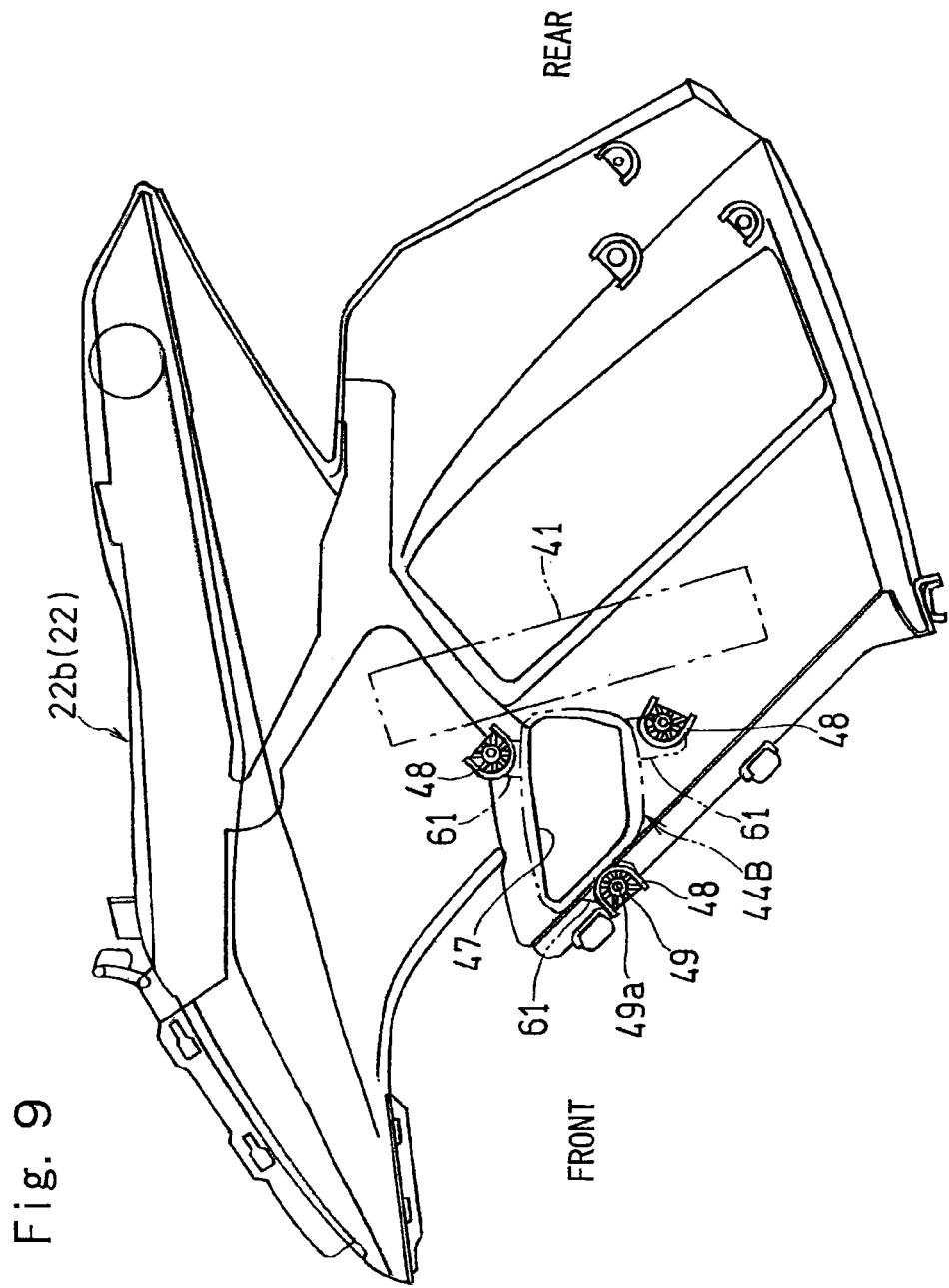
FIG. 9 is a side view showing a right side fairing segment, forming a part of the fairing assembly, showing how an inner surface thereof is finished.

FIG. 9 illustrates a side view of the right side fairing segment 22b, showing the shape of an inner surface side thereof. As shown therein, a portion of the front edge of the right side fairing segment 22b has a mounting opening 47 defined therein for receiving the right turn signal lamp 44B then inserted thereinto from an inner surface side towards an outer surface side, and support pieces 48 for supporting the turn signal lamp 44B, which has been inserted into the mounting opening 47, are formed integrally with the side fairing segment 22b and disposed at respective three, equally spaced locations around the mounting opening 47. The support pieces 48 are formed with respective bosses 49 each having a threaded hole 49a defined therein for threadingly receiving a corresponding fastening member used to support the turn signal lamp 44B as will be described later.

Figure 10:
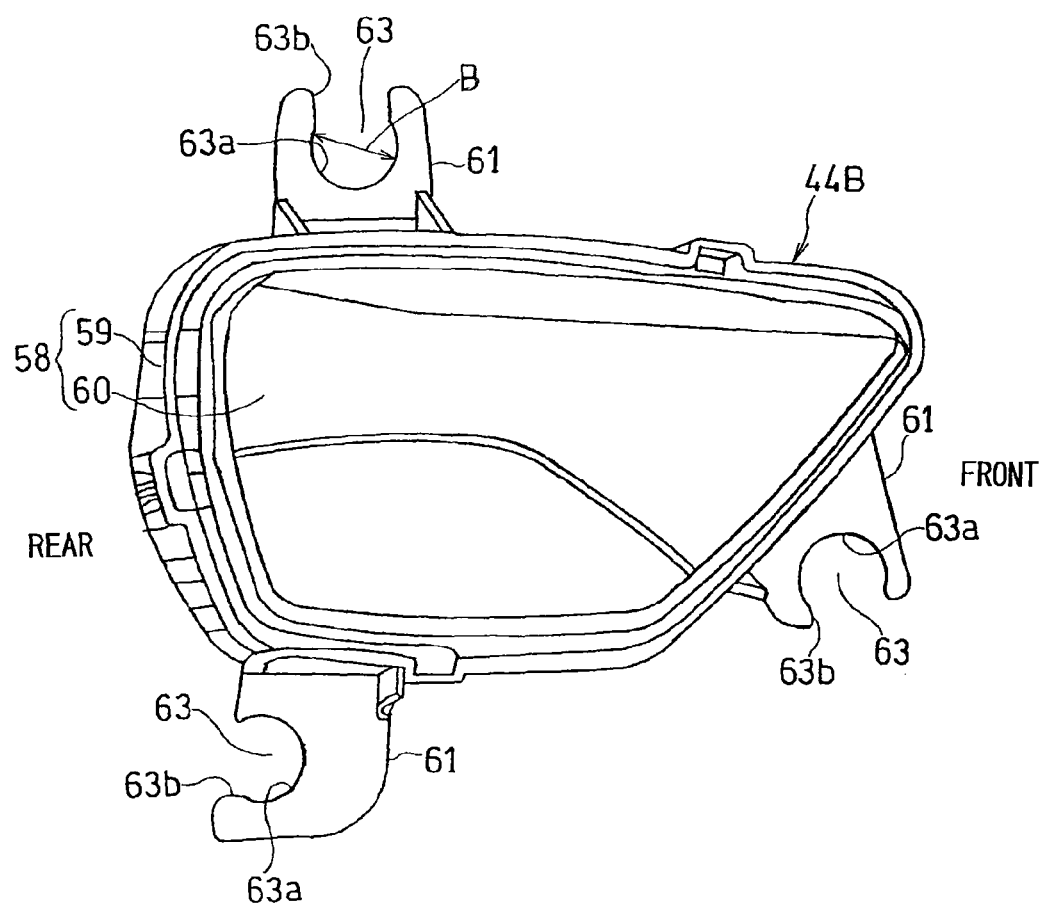
FIG. 10 is a side view showing a right turn signal lamp, which is one of the turn signal lamps incorporated in the fairing assembly.
Figure 11:
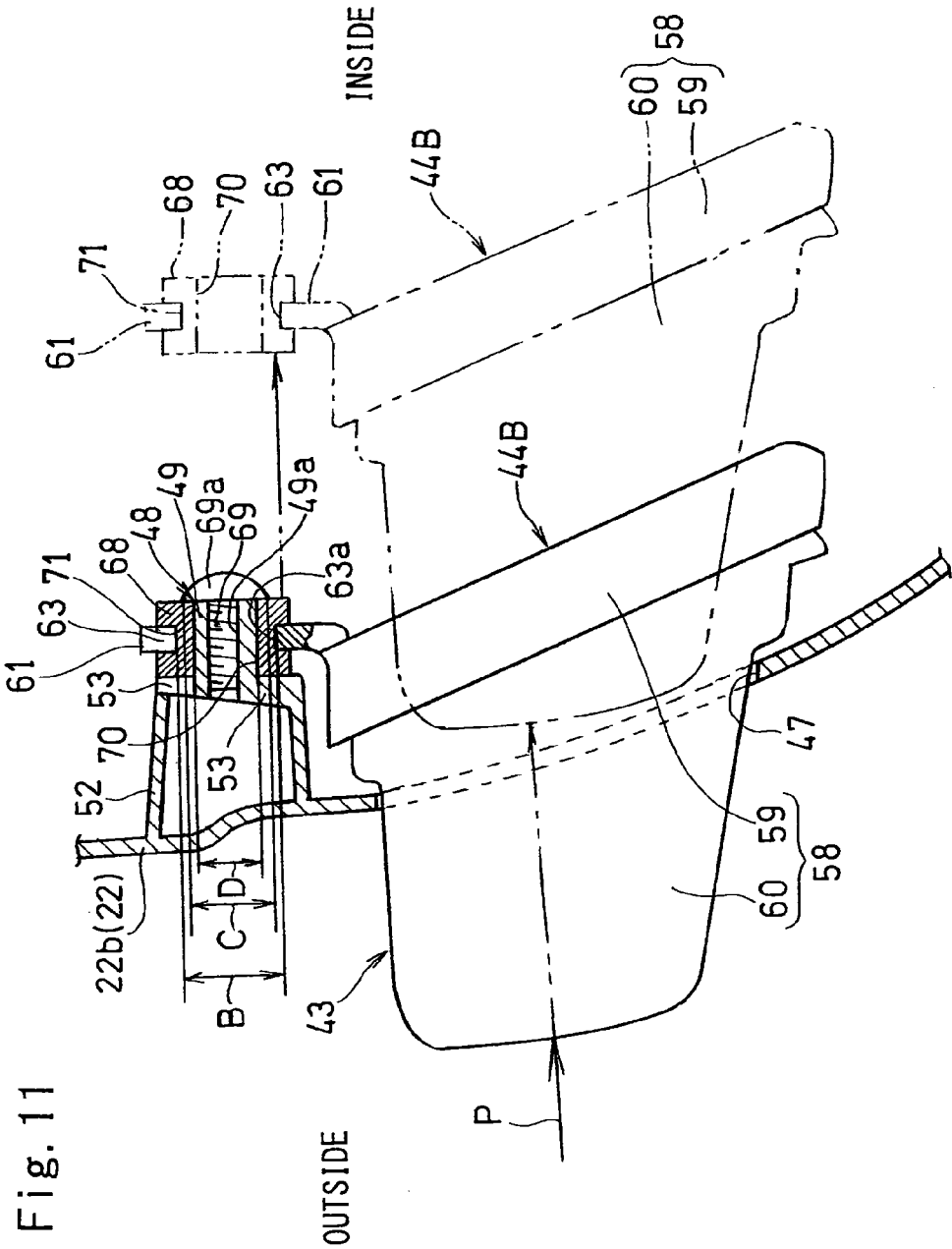
FIG. 11 is a cross sectional view taken along the line XI-XI in FIG. 1.

FIG. 10 is a side view of the right turn signal lamp 44B as viewed laterally from the motorcycle body and, as best shown therein, the turn signal lamp 44b is fitted having been inserted into the mounting opening 47 in a direction forwardly of the sheet of FIG. 9, with front and rear sides thereof inverted. FIG. 11 is a cross sectional view taken along the line XI-XI in FIG. 1, showing a portion of the turn signal lamp 44B that is mounted on the fairing segment 22b. As shown in FIG. 11, the turn signal lamp 44B includes a blinker casing 58 comprised of a casing base 59 and a casing covering 60 cupped onto the casing base 59, and a blinker lamp not shown is supported by the casing base 59 in any known manner and is covered by the casing covering 60 that is made of a light transmissive material and is so shaped as to protrude outwardly relative to the casing base 59.

As best shown in FIG. 10, the casing base 59 are formed with flanges 61, which are examples of to-be-supported members and which protrude outwardly from three peripheral portions of the casing base 59 so as to align with the three support pieces 48 integral with the side fairing segment 22b shown in FIG. 9. As shown in FIG. 10, each of those flanges 61 is of a generally U-shaped configuration having a support mouth 63 defined therein for receiving therein the respective boss 49 integral with the support piece 48 (FIG. 9). Each of the support mouth 63 has defined therein a generally semicircular support hole 63a and a cutout 63b communicated with the support hole 63a such that the round sectioned boss 49 of the respective support piece 48 can be engaged in the support hole 63a through the cutout 63b in a manner as will be described subsequently.

Figure 12:
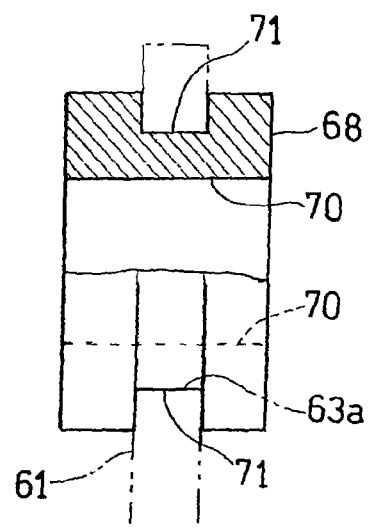
FIG. 12 is a schematic side view, with a portion shown in section, showing an elastic member used in fitting the turn signal lamp onto the fairing body.

Referring to FIG. 11, each of the flanges 61 in the turn signal lamp 44B is supported by the corresponding support piece 48 in the side fairing segment 22b through an elastic member 68 such as, for example, a rubber damper with the use of a fastening member 69 which is a support element such as, for example, a bolt. As best shown in FIG. 12, the elastic member 68 is of a substantially hollow cylindrical shape having an insertion hole 70, defined at a center portion thereof, and also having a circumferentially extending engagement groove 71, defined in an outer peripheral portion thereof, such that the elastic member 68, after having been mounted on the respective flange 61 through the cutout 63b with an inner peripheral edge around the support hole 63a engaged in the circumferential engagement groove 71 of the elastic member 68, is mounted to on the side fairing segment 22b with the corresponding boss 49 received within the insertion hole 70. In mounting the elastic member 68 onto the respective flange 61, the elastic member 68 is inserted into the support hole 63a through the cutout 63b of the support mouth 63 best shown in FIG. 10.

Figure 13:
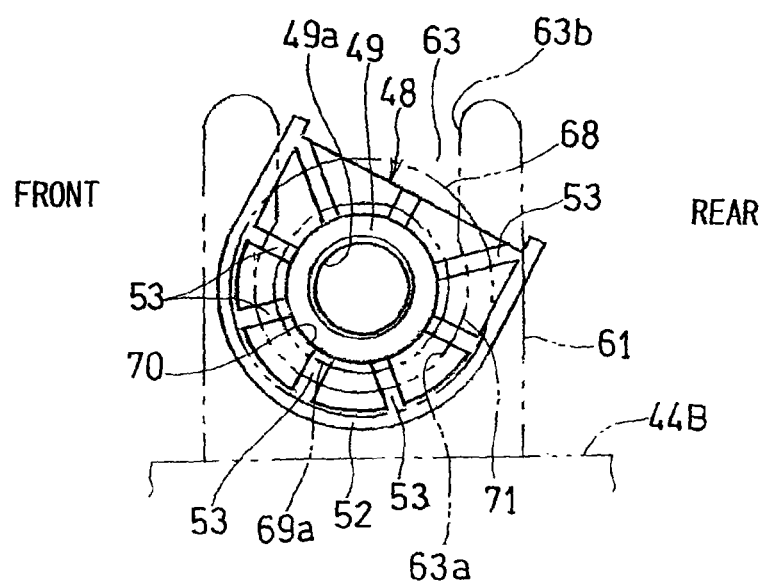
FIG. 13 is a side view showing the relation in position of a flange, which is a to-be-supported member of the turn signal lamp and the elastic member relative to a support portion of the fairing body.

FIG. 13 shows the condition, in which each of the elastic members 68 is engaged in the respective support hole 63a in the associated flange 61 and is then overlapped with the corresponding support piece 48. As shown therein, the support piece 48 includes a generally U-shaped support frame 52, surrounding ¾ of the outer circumference of the boss 49, and a plurality of retainer ribs 53 extending radially outwardly from the boss 49 to the support frame 52 so as to connect the boss 49 with the support frame 52.

Hereinafter, the manner of fitting the turn signal lamp 44B, shown in FIG. 11, to the side fairing segment 22b of the fairing body 22 will be described in detail. The elastic members 68 are mounted on the flanges 61 of the turn signal lamp 44B, respectively, in a manner with the peripheral edge of the support hole 63a of the support mouth 63 in each of the flanges 61 engaged in the circumferential engagement groove 71 in the corresponding elastic member 68. Subsequently, as the casing covering 60 of the turn signal lamp 44B is passed into the mounting opening 47 from the inner surface side of the side fairing segment 22b, the bosses 49 of the three support pieces 48 provided in the side fairing segment 22b are inserted into the respective insertion holes 70 defined in the associated elastic members 68 then mounted on the turn signal lamp 44B. In a condition in which the bosses 49 have been completely inserted into the respective insertion holes 70 until the elastic members 69 are brought into contact with inner side end portions of the retainer ribs 53 of the support pieces 48, the casing covering 60 of the turn signal lamp 44B protrudes considerably outwardly from the side fairing segment 22b. In this condition, the turn signal lamp 44B is retained having been engaged in the mounting opening 47 as shown by the solid line in FIG. 11 and the turn signal lamp 44 is thus temporarily retained in position.

Complete mounting of the turn signal lamp 44B on the side fairing segment 22b finishes when the fastening members 69 are firmly threaded into the respective threaded holes 49a in the bosses 49 with heads 69a of such fastening members 69 urging the associated elastic members 68 against the retainer ribs 53. By so doing, the turn signal lamp 44B can be fitted to the support pieces 48 of the side fairing segment 22b by means of the fastening members 69 through the elastic members 68 mounted on the respective flanges 61. It is to be noted that for the fastening members 69, any suitable fastening members such as, for example, rivets or tapping screw other than bolts can be employed, provided that they have heads required to urge the associated elastic members 68 against the retainer ribs 53 as hereinabove described.

In the meantime, the head 69a of the fastening member 69 has an outer diameter C, which is smaller than the inner diameter B of the support hole 63a in each of the flanges 61, but greater than the inner diameter D of the insertion hole 70 in the respective elastic member 68. Accordingly, at any usual time, the elastic member 68 having its insertion hole 70 at the center portion thereof, into which the corresponding boss 49 is inserted, is urged by the support frame 52 of the respective support piece 48 in the side fairing segment 22b and the retainer ribs 53 and is then fixed by the head 69a of the respective fastening member 69, which has the outer diameter greater than the inner diameter of the insertion hole 70.

By way of example, in the event that as a result of toppling of the motorcycle down to the ground the fairing body 22 contacts a fixture such as, for example, the ground, the turn signal lamp 44B protruding in a direction laterally outwardly from the fairing body 22 is acted upon by the external force acting in a direction laterally inwardly as shown by the arrow P in FIG. 11. Since at this time the inner peripheral edge around the support hole 63a of the respective flange 61 of the turn signal lamp 44B is engaged in the circumferentially extending engagement groove 71 of the elastic member 68, the elastic member 68 receives the external force, then applied to the turn signal lamp 44B (or 44A) through the respective flange 61. If this external force is higher than a predetermined permissible external force, the elastic member 68 is pressed by the flange 61 to undergo a considerable elastic deformation, whereupon the head 69a of the fastening member 69 breaks into the insertion hole 70 having its diameter then expanded radially outwardly in response to the elastic deformation of the elastic member 68.

Since as hereinabove described the inner diameter B of the support hole 63a of the respective flange 61 is greater than the outer diameter C of the head 69a of the fastening member 69, the flange 61 displaces in a direction laterally inwardly of the fairing body 22 while the support hole 63a thereof moves together with the elastic member 68 and passes the head 69a of the fastening member 69, thereby allowing the elastic member 68 and the flange 61 to disengage from the head 69a of the fastening member 69. Accordingly, the support of the turn signal lamp 44B by each of the support pieces 48 in the side fairing segment 22b is thus released.

In the manner described above, the turn signal lamp 44B is in part or wholly collapsed inwardly of the motorcycle body through the mounting opening 47 when urged by the external force. As a result of the external force absorbed upon collapse, an undesirable impairment or damage to the casing covering 60 of the turn signal lamp 44B can be avoided.

It is to be noted that even the left turn signal lamp 44A is similarly supported by the left side fairing segment 22a because of the same structure as that of the right turn signal lamp 44B described hereinabove.

The permissible external force referred to above is of a magnitude somewhat lower than the external force which leads to the impairment or damage to the blinker casing 58 of the turn signal lamp 44B shown in FIG. 11 and, if the elastic force of the elastic member 68 and the difference between the outer diameter C of the head 69a of the fastening member 69 and the inner diameter D of the insertion hole 70 of the elastic member 68 are suitably chosen, the elastic member 68, which is acted on by the external force higher than the permissible external force through the respective flange 61, can pass over the head 69a of the fastening member 69 to move in a direction laterally inwardly of the motorcycle body upon elastic deformation thereof. In other words, the elastic member 68, when receiving the external force of a magnitude not higher than the permissible external force, is merely urged by the head 69a of the fastening member 69 and is not moved in the direction laterally inwardly of the motorcycle body and, hence, there is no possibility that the turn signal lamp 44 may accidentally displace.

Also, the turn signal lamp 44B is supported by the support pieces 48 of the side fairing segment 22b in a condition in which the fastening member 69 is inserted into the insertion hole 70, defined in each of the cylindrical elastic members 68 that are engaged with the three flanges 61, to inhibit a displacement in a direction other than the direction laterally of the vehicle body along the corresponding fastening member 69. Accordingly, the turn signal lamp 44B is assuredly inhibited from accidentally displacing during the normal time and retained stably at a desired position.

FIG. 9 shows by the double dotted chain line the position at which the radiator 40 is fitted when the right side fairing segment 22b of the fairing body 22 is mounted on the motorcycle. The three support pieces 48 formed in the side fairing segment 22b are arranged displaced a distance forwardly of the radiator 41. The left side fairing segment 22a shown in FIG. 2 is of a shape symmetrical with the right side fairing segment 22b described above. Accordingly, it is possible to prevent any one of the left and right turn signal lamps 44A and 44B from colliding against the radiator 41 of a relatively large size, as compared with the turn signal lamps, when one of the left and right turn signal lamps 44A and 44B is collapsed in a direction laterally inwardly of the motorcycle body by the reason discussed hereinbefore.

Figure 14:
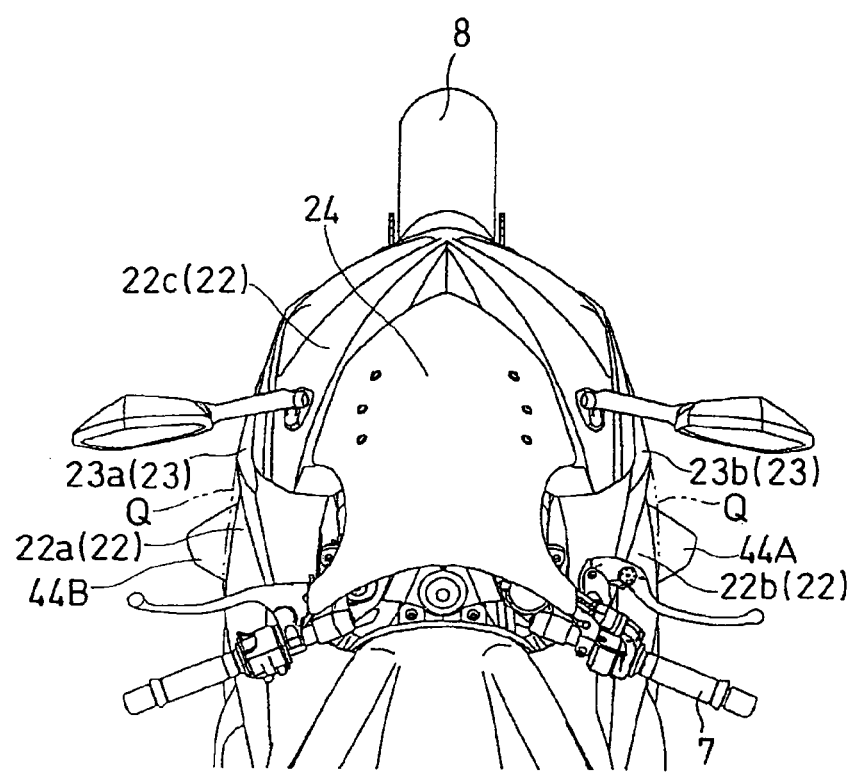
FIG. 14 is a schematic top plan view showing the front portion of the motorcycle having the fairing assembly mounted thereon.

The fairing assembly 43 according to the embodiment is so designed and so configured that when one or both of the side fairing segments 22a and 22b contact the fixture such as, for example, the ground and then receive a considerable external force in a direction laterally inwardly thereof, the turn signal lamps 44A and 44B can be collapsed to a position flush with or further inwardly of the respective outer side surface of the side fairing segments 22a and 22b of the fairing assembly. The outer side surface in the laterally outward direction referred to above means, as shown by the double dotted line in FIG. 14, the imaginary plane Q connecting a plurality of sites in the vicinity of the mounting openings 47 for receiving the turn signal lamps 44A and 44B in the corresponding side fairing segments 22a and 22b, which protrude most in the direction laterally outwardly of the motorcycle body.

When the turn signal lamps 44A and 44B are moved, one at a time, in the laterally inward direction in response to the external force more than the predetermined permissible force as hereinbefore described, the support thereof by the support pieces 48 in the respective side fairing segment 22a or 22b is released to assume the condition in which it is merely retained as collapsibly inserted into the corresponding mounting openings 47. Therefore, the turn signal lamp 44A or 44B can be urged inwardly of the side fairing segment 22a or 22b until the fixture contacts the outer surface of the side fairing segment 22a or 22b. Accordingly, it is possible to effectively prevent the turn signal lamp 44A or 44B from being impaired or damaged upon receipt of the large external force.

The fairing assembly employed in the embodiment can be equally used in a motorcycle of a type having the fairing unit with no front edge member employed. In other words, if the turn signal lamps are arranged so as to protrude in respective directions laterally outwardly from the fairing unit, contact of the fairing body with the ground as a result of, for example, toppling of the motorcycle down to the ground will result in application of the considerable external force thereto. Therefore, if the turn signal lamps are so designed and so configured as to be collapsible laterally inwardly of the fairing unit upon receipt of such considerable external force, the external force can be absorbed to avoid an undesirable impairment or damage to the fairing unit.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE NUMERALS

21 . . . Fairing unit
22 . . . Fairing body
23 . . . Front edge member
23a, 23b . . . Front edge piece
28 . . . Rear edge of an outer surface of the front edge member
29 . . . Front portion of an outer surface of the fairing body
37 . . . Step
41 . . . Radiator
42 . . . Discharge port
43 . . . Fairing assembly
44A, 44B . . . Turn signal lamp
48 . . . Support piece
49 . . . Boss
49a . . . Head
61 . . . Flange (To-be-supported member)
63a . . . Support hole
68 . . . Elastic member
69 . . . Fastening member (Support element)
71 . . . Engagement groove
A . . . Incoming wind
B . . . Inner diameter of the support hole
C . . . Outer diameter of the head
D . . . Inner diameter of an insertion hole for the elastic member
E . . . Combustion engine
FR . . . Motorcycle frame structure (Vehicle body)

What is claimed is:

1. A fairing unit for a motorcycle for enclosing a front portion of a vehicle body, which comprises:
a fairing body;
a front edge member removably mounted on the fairing body and forming a principal component of a front edge of the fairing unit, wherein the front edge member in its entirety is of an elongated strip-like shape, and
a turn signal lamp fitted to the fairing body at a location rearwardly of the front edge member in the fairing body so as to protrude outwardly from the fairing body in a direction widthwise of the vehicle body, the turn signal lamp being supported for collapsible movement in a direction inwardly and into the fairing body in the widthwise direction of the vehicle body.

2. The fairing unit for the motorcycle as claimed in claim 1, in which the front edge member, extends down to a lower edge of the fairing unit, and is smaller in size than the fairing body.

3. The fairing unit for the motorcycle as claimed in claim 1, in which the front edge member is made of a resin containing a coloring agent and the fairing body has an outer side surface painted to form a paint coating thereon, wherein
the front edge member has its surface colored by the coloring agent, which has been added in the material.

4. The fairing unit for the motorcycle as claimed in claim 1, in which the front edge member has an outer surface, a rear edge of which is displaced outwardly from a front portion of an outer surface of the fairing body.

5. The fairing unit for the motorcycle as claimed in claim 1, in which the turn signal lamp is collapsible to a position flush with an outer side surface of the fairing body in the widthwise direction or to a position further inwardly of the first mentioned position.

6. The fairing unit for the motorcycle as claimed in claim 1, in which the turn signal lamp is supported not to displace in a direction other than the widthwise direction of the vehicle body and prevented from moving in a direction inwardly of the widthwise direction of the vehicle body upon application of an external force lower than a predetermined allowable external force, but movable in the direction inwardly of the widthwise direction of the vehicle body upon application of the external force equal to or greater than the predetermined allowable external force.

7. The fairing unit of the motorcycle as claimed in claim 1, in which the width of the front edge member as measured in a direction forwards and rearwards is set to a value within the range of 100 to 200 mm.

8. The fairing unit of the motorcycle as claimed in claim 1, in which the front edge member has a surface having a multiplicity of minute surface irregularities.

9. The fairing unit of the motorcycle as claimed in claim 1, wherein the fairing body extends rearward along the side of the motorcycle beyond an entire rear side of the front edge member.

10. A fairing assembly for a motorcycle for enclosing a front portion of a vehicle body, which comprises;
   a fairing unit including a fairing body; and
   a turn signal lamp protruding outwardly from the fairing body in a direction widthwise of the vehicle body;
   the turn signal lamp being supported for collapsible movement in a direction inwardly in the widthwise direction of the vehicle body by the fairing body through an elastic member by means of a support element,
   the elastic member being so set as to move in a direction inwardly of a widthwise direction of the vehicle body relative to the support element to thereby allow the turn signal lamp to retract in the direction inwardly of the widthwise direction, when an external force equal to or greater than a predetermined allowable external force acts on the turn signal lamp,
   the support element comprising a fastening member fastened to a boss of the fairing body, and
   the elastic member having an insertion hole defined at a center portion thereof, and
   the turn signal lamp being supported by the fairing body with the fastening member passed through the insertion hole and with a head of the fastening member urging the elastic member against the boss.

11. The fairing assembly for the motorcycle as claimed in claim 10, in which the turn signal lamp has a support hole and the elastic member is of a substantially cylindrical configuration having its outer periphery formed with an engagement groove in which an inner peripheral edge of the support hole in the turn signal lamp is engageable and in which the head of the fastening member is smaller than an inner diameter of the support hole and greater than an inner diameter of the insertion hole in the elastic member.

12. A fairing assembly for a motorcycle for enclosing a front portion of a vehicle body, which comprises:
   a fairing unit including a fairing body; and
   a turn signal lamp protruding outwardly from the fairing body in a direction widthwise of the vehicle body, the turn signal lamp being supported to enable a collapsible movement in a direction inwardly in the widthwise direction of the vehicle body into the fairing body through an elastic member by means of a support element,
   the elastic member being so set as to move in a direction inwardly of a widthwise direction of the vehicle body relative to the support element to thereby allow the turn signal lamp to retract in the direction inwardly of the widthwise direction, when an external force equal to or greater than a predetermined allowable external three acts on the turn signal lamp, and
   the turn signal lamp having a plurality of flanges located at plural portions on the turn signal lamp and being fitted to the fairing body by means of individual support members that are inserted in each of the flanges.

13. A fairing assembly for a motorcycle, which comprises:
   a fairing unit for enclosing a front portion of a vehicle body; and
   a turn signal lamp fitted to the fairing unit so as to protrude from the fairing unit in a direction laterally outwardly of the vehicle body;
   the turn signal lamp being supported to enable a collapsible movement in a direction inwardly of the width of the vehicle body to a position flush with a laterally outer side surface of the fairing body or a position further inwardly of the laterally outer side surface of the fairing body.

14. The fairing assembly for a motorcycle as claimed in claim 13, in which the fairing body has a support piece by which a to-be-supported member, integral or rigid with the turn signal lamp, is supported, the to-be-supported member being arranged at a location displaced from a radiator for dissipating heat from an engine cooling water in a longitudinal direction of the vehicle body.

15. The fairing assembly for a motorcycle as claimed in claim 13, in which the turn signal lamp is supported by the fairing body through an elastic member by means of a support element and in which the elastic member is so set as to move in a direction inwardly of a widthwise direction of the vehicle body relative to the support element to thereby allow the turn signal lamp to retract in the direction inwardly of the widthwise direction, when an external force equal to or greater than a predetermined allowable external force acts on the turn signal lamp.

16. A fairing assembly for a motorcycle, which comprises:
   a fairing unit for enclosing a front portion of a vehicle body; and
   a turn signal lamp fitted to the fairing unit so as to protrude from the fairing unit in a direction laterally outwardly of the vehicle body;
   wherein the turn signal lamp is supported to enable a collapsible movement in a direction inwardly of the width of the vehicle body but not to be displaced in a direction other than a widthwise direction of the vehicle body and is prevented from moving in a direction inwardly of the widthwise direction of the vehicle body upon application of an external force lower than a predetermined allowable external force, but movable in the direction inwardly of the widthwise direction of the vehicle body upon application of the external force equal to or greater than the predetermined allowable external force.

17. A fairing assembly for a motorcycle, which comprises:
   a fairing unit for enclosing a front portion of a vehicle body; and
   a turn signal lamp fitted to the fairing unit so as to protrude from the fairing unit in a direction laterally outwardly of the vehicle body;
   the turn signal lamp being supported for collapsible movement in a direction inwardly of the width of the vehicle body by the fairing body through an elastic member by means of a support element,
   the elastic member being so set as to move in a direction inwardly of a widthwise direction of the vehicle body relative to the support element to thereby allow the turn signal lamp to retract in the direction inwardly of the widthwise direction, when an external force equal to or greater than a predetermined allowable external force acts on the turn signal lamp, the support element comprising a fastening member fastened to a boss of the fairing body, the elastic member having an insertion hole defined at a center portion thereof and the turn signal lamp being supported by the fairing body with the fastening member passed through the insertion hole and with a head of the fastening member urging the elastic member against the boss.

\* \* \* \* \*